Oct. 23, 1956
I. WOLAR
2,767,953
LIGHTING FIXTURE HANGERS AND CANOPY SUPPORTS
Filed Jan. 29, 1953
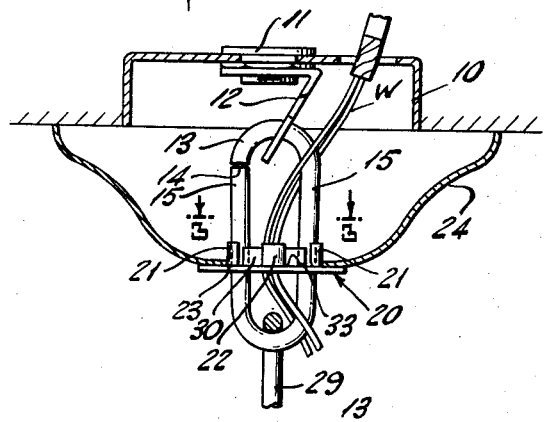
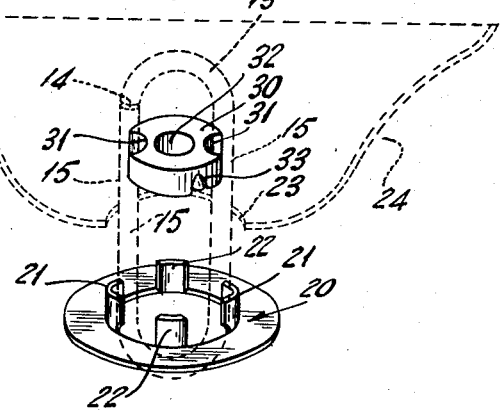
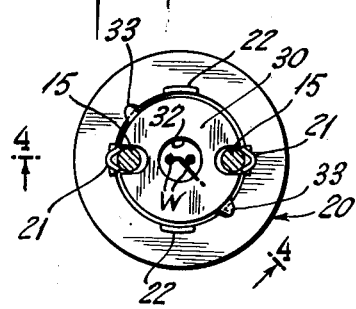
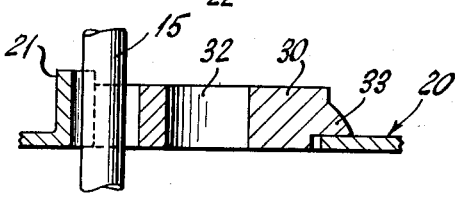
INVENTOR
*ISIDORE WOLAR*
BY
ATTORNEY

United States Patent Office 2,767,953
Patented Oct. 23, 1956

2,767,953

LIGHTING FIXTURE HANGERS AND CANOPY SUPPORTS

Isidore Wolar, Mount Vernon, N. Y.

Application January 29, 1953, Serial No. 333,934

5 Claims. (Cl. 248—343)

The present invention relates to lighting fixture hangers and canopy supports.

In supporting a lighting fixture having a chain type hanger, it has been customary to provide a suitable hickey, a wire-receiving tube, a ring and other fittings to support the canopy and to provide a loop to receive the upper link of the chain. All these parts imposed substantial cost in the manufacture and installation of the fixture. Stem type fixtures require other forms of relatively expensive parts and generally include a swivel.

The present invention contemplates chain hanger fixture supports wherein the chain itself or a chain link extends through the canopy and is supported directly from the outlet box by a hook or suitable fitting, the canopy is manually slidable along the fixture supply wires and the chain or stem, and is supported from the chain or chain link and when at the proper mounting height is held against undesired sliding movement by the inherent resiliency of the chain link so as to support the canopy.

The present invention contemplates the employment of fixture hangers of the chain or stem type having at or near the top a relatively long straight-sided link hanging down from a hook or the like. This link receives a sliding member having a canopy retaining flange and is shaped so as to center the canopy above the flange and at the same time grip the straight-sided chain link and engage it frictionally.

The link is of the open or unwelded type and the sides are normally slightly out of parallelism and spaced wider near the open end than near the closed end so that when the slider moves along the link, it bends the closed end of the link and builds up the friction between the link walls and the slider. The slider is preferably a sheet metal stamping in which the elements engaging the link and aligning the canopy are in the form of upwardly extending prongs. In order to prevent access to the interior of the canopy and outlet box through the hole in the sliding member and to improve the appearance of the fixture support, the present invention contemplates having a slidable fitting inside the link arranged so that it rides up along the chain when the canopy is pushed up into position, and provided with a wire receiving opening.

The accompanying drawings show, for purposes of illustrating the present invention, one embodiment in which the invention may take form, it being understood that the drawings are illustrative of the invention rather than limiting the same.

In these drawings, Figure 1 is a sectional view illustrating a lighting fixture and canopy support with the canopy in upper position;

Figure 2 is a perspective view illustrating the link supporting member, canopy, and fitting;

Figure 3 is a cross-sectional view on line 3—3 of Figure 1; and

Figure 4 is a cross-sectional view on line 4—4 of Figure 3, and at a larger scale.

Figure 1 shows at 10 a conventional shallow outlet box having the usual outlet box stud 11 and mounted in the ceiling. This outlet box stud carries a hickey or hook member 12, and a chain link 13. The link shown is of the straight-sided type with the gap or opening 14 in the side of the link. Any form of outlet box or hook may be used to support the chain link and this link is a long chain link of standard size.

The sides of the link are indicated at 15—15 and these are normally straight elements and diverge from the lower or closed end as indicated in the drawing toward the upper end so that when they are moved back into parallelism, they can frictionally grip the sliding member to be described.

As shown in the drawings, the sliding member 20 is a sheet metal stamping with four upwardly extending prongs. Two of the prongs 21—21, opposite one another, are spaced the proper amount to fit about the sides 15—15 of the link and are preferably of relatively very sharp, V-shaped cross section as indicated in Figure 3. The stamping also has two upwardly extending prongs 22—22 which together with the prongs 21—21 are adapted to enter into the center hole 23 of the canopy 24 and align the canopy.

In this construction, the canopy is held up by the sliding member 20 which frictionally engages the link so as to support the canopy and the sliding member and canopy can freely slide down along the lower links of the chain such as the link 29. While these links are of the same width as the upper chain link, no damage is done to the paint or lacquer on the lower chain links by sliding the parts along them. The sliding member 20 moves as freely as a ring as the prongs dodge the links.

A fitting 30 is received between the sides of the link 15—15. This fitting is notched as indicated at 31—31 so as to loosely receive the link. It has a center hole 32 for wiring W and has staked out lugs 33—33, which are adapted to rest on the upper surface of the sliding member 20 so as to move up and down with this member but always be above it. The fitting 30 closes up the opening in the sliding member so that one cannot look up inside the canopy.

This form of construction is an improvement over one of the forms shown in my copending application Serial No. 309,488, filed September 13, 1952.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. In combination, a lighting fixture hanger including a top support and a plurality of chain links hanging pendant from the top support, the upper link being at least as wide as the other links and open at the top and having straight downwardly converging sides, a canopy having an opening through which the chain extends so that the canopy moves along a plurality of chain links, and a canopy supporting ring in the form of a flat plate of greater outside diameter than the opening in the canopy, and having an opening through which the chain extends and of a size to permit it to move along a plurality of chain links, and also having two upwardly extending prongs at diametrically opposite sides of said opening and spaced and shaped so as to fit about the uppermost chain link and frictionally grip its sides as the ring is shifted upwardly along the link, whereby the ring may be supported from the upper link and the canopy from the ring, and the ring and canopy may be moved freely down along the lower links.

2. The combination of claim 1, wherein an inner sliding member is disposed in the upper link and has stop shoulders engageable with the ring to support the sliding member at a level corresponding with that of the ring when the ring is gripping the upper link to thereby close the opening in the ring, and a central opening to accommodate fixture wiring.

3. A lighting fixture hanger and canopy support, comprising a fixed link support, a fixture supporting chain having at the top a straight sided chain link open at the upper end and provided with downwardly converging side members, and a sliding member including a flat, apertured ring for supporting the canopy and having two upwardly extending prongs slidable along the sides of the link and tightly engaging the same to bend the link sides toward one another as the sliding member is moved up the link to effectuate a frictional grip with the link, and additional upwardly extending prongs adapted to enter the hole in the canopy to align and center the canopy.

4. The combination with a lighting fixture hanger chain of the type having the successive links at right angles to one another, one of the links having straight substantially parallel sides, and a normally recessed outlet box having a pendent chain support in which the uppermost link of the chain is received so that the chain hangs down, and wiring extending from the interior of the outlet box downwardly along the chain, of means to cover the outlet box and chain support and conceal the wiring comprising an apertured canopy freely movable along the said chain and wiring, and means for supporting the canopy from the chain at variable elevations along the straight-sided link comprising a ring below the canopy, the ring having a canopy supporting flange larger than the canopy opening, an opening of a size to permit sliding the ring along the chain and two upwardly extending portions adapted to pass through the canopy opening and of a size and shape when aligned with the said uppermost link to frictionally grip the said link and support the canopy.

5. The combination of claim 4, having an inner fitting slidable inside the upper link and provided with stop shoulders to engage the ring and support the inner fitting from the ring when the ring is engaged with the said link, and having a wireway opening to accommodate wiring.

References Cited in the file of this patent

UNITED STATES PATENTS

| | | |
|---|---|---|
| 1,363,935 | Vette | Dec. 28, 1920 |
| 1,380,147 | Hoar | May 31, 1921 |
| 1,661,999 | Crowell | Mar. 6, 1928 |
| 1,778,869 | Schockett | Oct. 21, 1930 |
| 1,841,726 | Glowacki | Jan. 19, 1932 |
| 1,882,312 | Aspinwall | Oct. 11, 1932 |
| 1,908,588 | D'Olier | May 9, 1933 |
| 2,309,143 | Sutherland | Jan. 26, 1943 |
| 2,355,353 | Wolfe | Aug. 8, 1944 |
| 2,614,785 | Versen | Oct. 21, 1952 |